April 23, 1935.  G. E. RAMSTAD  1,998,523

LADY'S COMPACT

Filed Feb. 6, 1933

INVENTOR

George Essaias Ramstad

Patented Apr. 23, 1935

1,998,523

UNITED STATES PATENT OFFICE 1,998,523

LADY'S COMPACT

George Esaias Ramstad, Milwaukee, Wis.

Application February 6, 1933, Serial No. 655,456

2 Claims. (Cl. 240—6.45)

This invention relates to vanity cases of the self illuminated type.

One object of the present invention is to provide a self illuminated vanity case of exceptionally compact, simple, and economical design.

Other more specific objects and advantages will appear, expressed or implied, from the following description of an illustrative embodiment of the present invention.

In the accompanying drawing:—

Figure 1:
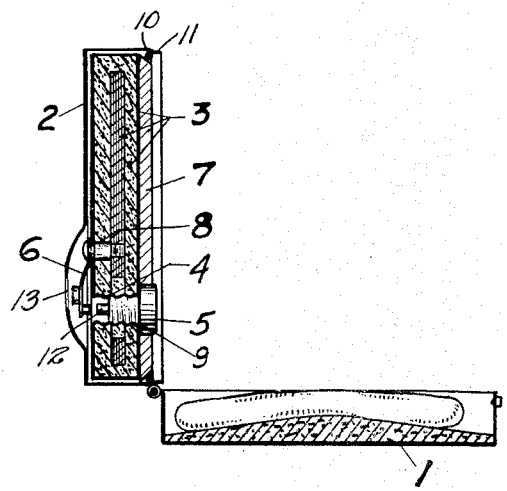
Figure 2:
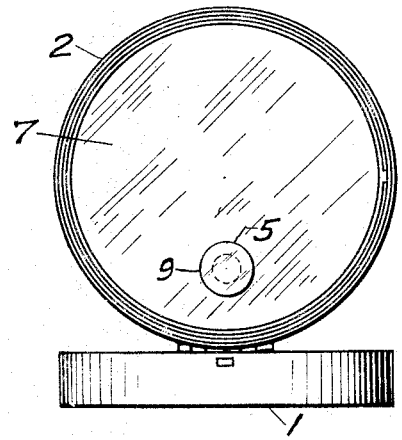

Figure 1 is a sectional view and Fig. 2 a front elevation of a vanity case constructed in accordance with the present invention, showing the same in open condition.

The vanity case shown comprises a thin body portion 1, providing a customarily shallow compartment for cosmetic materials, and a separable cover portion 2 of like thinness hinged thereto.

The cover portion houses and supports a thin, flat, disk-like battery 3 and mirror 7, releasably retained therein by appropriate means, such as a split ring 10, confined between the periphery of the mirror and an internal shoulder formed at the base of the circular edge flange 11 of the cover.

The battery shown is recessed to receive and support a small incandescent lamp 5, the mirror 7 also being recessed to accommodate the lamp. In this instance a metal tube 4, penetrating the battery and contacting with the outer zinc electrode thereof, provides a socket for the stem of the lamp and constitutes one side of the electric circuit. The inner carbon electrode of the battery is electrically connected, through a retainer element 8, with a switch 6, which may be moved to contact a button 12 on the stem of the lamp to complete the other side of the circuit.

The switch 6 is preferably arranged within the top of the casing beneath an aperture 13 through which the switch may be manually closed by the pressure of a finger through the aperture.

The rear of the lamp is preferably externally coated, as at 9, with an appropriate light reflecting medium to increase the lighting efficiency thereof.

By combining and arranging the several parts in the manner hereinabove described, a lighting system, including a battery of ample capacity, may be contained within a vanity case of a size not materially larger than those unlighted vanity cases now in general use.

Various changes may be made in the embodiment of the invention hereinabove specifically described without departing from or sacrificing the advantages of the invention as defined in the appended claims:—

I claim:—

1. A vanity case comprising relatively thin base and cover portions, said base portion comprising a receptacle for cosmetic materials, a relatively thin electric battery seated in said cover portion, said battery having an opening extending therethrough, an incandescent lamp having a stem mounted in said opening, a mirror covering one side of said battery, means including a switch at the other side of said battery for establishing an electric connection between said battery and lamp, and means in the face of said cover portion through which said switch is actuatable.

2. A vanity case comprising relatively thin base and cover portions, said base portion comprising a receptacle for cosmetic materials, a relatively thin electric battery seated in said cover portion, and substantially coextensive therewith, said battery having a tube extending therethrough, an incandescent lamp having a stem supported in said tube, and means including said tube for establishing an electrical circuit between said battery and lamp.

GEORGE ESAIAS RAMSTAD.